(12) United States Patent
Biollaz et al.

(10) Patent No.: US 8,535,840 B2
(45) Date of Patent: Sep. 17, 2013

(54) METHOD AND PLANT FOR CONVERTING SOLID BIOMASS INTO ELECTRICITY

(75) Inventors: Serge Biollaz, Waldshut (DE); Markus Jenne, Mittelbiberach (DE); Florian Nagel, Adliswil (CH); Tilman J. Schildhauer, Brugg (CH)

(73) Assignee: Paul Scherrer Institut, Villigen/PSI (CH)

( * ) Notice: Subject to any disclaimer, the term of this patent is extended or adjusted under 35 U.S.C. 154(b) by 1070 days.

(21) Appl. No.: 12/514,316

(22) PCT Filed: Oct. 24, 2007

(86) PCT No.: PCT/EP2007/009213
§ 371 (c)(1),
(2), (4) Date: May 11, 2009

(87) PCT Pub. No.: WO2008/055591
PCT Pub. Date: May 15, 2008

(65) Prior Publication Data
US 2009/0305093 A1 Dec. 10, 2009

(30) Foreign Application Priority Data
Nov. 9, 2006 (EP) .................................... 06023301

(51) Int. Cl.
*H01M 8/06* (2006.01)
(52) U.S. Cl.
USPC ............ 429/426; 429/410; 429/440; 429/513
(58) Field of Classification Search
USPC .................................. 429/410, 426, 440, 513
See application file for complete search history.

(56) References Cited

U.S. PATENT DOCUMENTS

| | | | |
|---|---|---|---|
| 4,759,846 | A | 7/1988 | MacFarlane |
| 4,921,765 | A | 5/1990 | Gmeindl et al. |
| 5,157,201 | A | 10/1992 | Norris |
| 5,554,453 | A | 9/1996 | Steinfeld et al. |
| 5,772,707 | A | 6/1998 | Wiesheu et al. |
| 6,548,197 | B1 | 4/2003 | Chandran et al. |
| 6,863,868 | B1 | 3/2005 | Alvin |
| 7,291,259 | B2 | 11/2007 | Gupta et al. |
| 7,309,416 | B2 | 12/2007 | Fokema et al. |
| 2002/0006377 | A1 | 1/2002 | Castner et al. |

(Continued)

FOREIGN PATENT DOCUMENTS

| | | |
|---|---|---|
| CA | 2461716 A1 | 4/2003 |
| DE | 19526886 C1 | 9/1996 |

(Continued)

OTHER PUBLICATIONS

K. Kendall: "Hopes for a flame-free future", Nature, vol. 404, Mar. 16, 2000, pp. 233-235, www.nature.com.

(Continued)

*Primary Examiner* — Patrick Ryan
*Assistant Examiner* — Alex Usyatinsky
(74) *Attorney, Agent, or Firm* — Laurence A. Greenberg; Werner H. Stemer; Ralph E. Locher

(57) ABSTRACT

A self-contained system for the generation of electrical energy from biomass by gasification combines several process units in one self-contained system. The global properties are greater than the sum of the individual properties of the process units.

7 Claims, 2 Drawing Sheets

(56) References Cited

U.S. PATENT DOCUMENTS

| | | |
|---|---|---|
| 2002/0194782 A1 | 12/2002 | Paisley |
| 2003/0051456 A1 | 3/2003 | Alvin et al. |
| 2003/0180215 A1 | 9/2003 | Niu et al. |
| 2004/0244289 A1 | 12/2004 | Morozumi et al. |
| 2004/0265194 A1* | 12/2004 | Carroni et al. ............ 422/212 |

FOREIGN PATENT DOCUMENTS

| | | |
|---|---|---|
| DE | 10002025 A1 | 8/2001 |
| EP | 0201290 A2 | 11/1986 |
| EP | 0576096 A2 | 12/1993 |
| EP | 1136542 A1 | 9/2001 |
| EP | 1201290 A1 | 5/2002 |
| WO | 0026136 A1 | 5/2000 |
| WO | 0222763 A1 | 3/2002 |
| WO | 2005007780 A2 | 1/2005 |

OTHER PUBLICATIONS

Lee F. Brown: "A comparative study of fuels for on-board hydrogen production for fuel-cell-powered automobiles", International Journal of Hydrogen Energy, vol. 26, Issue 4, pp. 381-397, 2001.

J. Larminie et al: "Fuel cell systems explained" ISBN 0-471-490261-1, pp. 198-199, 2000.

L. Gauckler et al.: "Solid Oxide Fuel Cells: Systems and Materials" Fuel Cell Research in Switzerland, Chimia, vol. 58, Issue 12, pp. 837-850, 2004.

Jens Parson: "Thermodynamic Modelling and Performance of Combined Solid Oxide Fuel Cell and Gas Turbine Systems", Dissertation, Lund University, Sweden, May 2002.

U. Bossel: "The birth of the fuel cell (1835-1845). Complete correspondence between Christian Friedrich Schoenbein and William Robert Grove", European Fuel Cell Forum, ISBN 3-905-59206-1, pp. 62-63.

M. Klemm: "Heissenteerung von Brenngas aus der Vergasung von Biomasse durch katalytische partielle Oxidation", VDI Progress Report Series 6, No. 525, pp. 210-211, 2005—English abstract.

"An updated Assessment of the Prospecs for Fuel Cells in Stationary Power and Chp", DTI Report, URN No. 05/705.

Steven Schaffer: "Development Update on Delphi's Solid Oxide Fuel Cell System", 6th Annual SECA Workshop, Delphi/Batelle, 2005.

Carrette et al.: "Fuell Cells—Fundamentals and Applications"; Fuell Cells, vol. 1, Issue 1, pp. 5-39, 2001.

Robed Leinfelder: "Reaktionskinetische Untersuchungen zur Methan-Dampf-Reformierung und Shift-Reaktion an Anoden oxidkeramischer Brennstoffzellen"; Dissertation, University of Erlangen-Nuremberg, 2004—English abstract pp. 107-108.

Ulrich Bartmann: "Reaktionstechnische Untersuchungen zur katalytischen partiellen Oxidation von Methan mit Sauerstoff zu Synthesegas in Fettbettreaktoren", Dissertation, Ruhr University Bochum, 1999—English abstract.

R. Bosch: "Perspectives on Fuel Cells vs. incumbent technologies"; Delphi, Fuel Cell Seminar 2005, Nov. 15 2005.

"Thermaly integrated high power density SOFC generator"; FuelCell Energy, Inc. Vera Power Systems Inc., SECA Annual Meeting, Pacific Grove, California Apr. 18-21, 2005.

Zhijiang Li et al.: "Diesel and Jet Fuel processing for portable fuel cell applications"; Aspen Products Group, Inc., Fuel Cell Seminar, 2006; Book; 2006.

* cited by examiner

METHOD AND PLANT FOR CONVERTING SOLID BIOMASS INTO ELECTRICITY

TECHNICAL FIELD

The invention relates to a method and a plant for the highly efficient generation of electricity from biomass. The plant concept combines the technologies of "biomass gasification" and of the "solid oxide fuel cell", with new solutions being disclosed in particular in the areas of thermal integration, controllability and simplicity of the system.

STATE OF THE ART

The currently known state of the art of biomass-driven fuel cell plants will be outlined in the sections below. The most common process units and corresponding reactors will be presented.

Gasification of Biomass

Gasification is a relatively old technology, which was initially researched with respect to coal as a fuel. Depending on the desired plant size and the intended purpose and desired cleanness of the product gas produced, many different types of gasifier have been developed.

Fixed-bed gasifiers are predestined for applications up to 10 $MW_{th}$. The types of reactor which have been developed are relatively simple and can be subdivided into counter-current, co-current and cross-draught gasifiers. The main distinguishing feature is the direction of flow of the gasification medium relative to the gasification material.

In counter-current gasifiers, the gasification material is usually introduced into the gasifier from above. The gasification medium, usually air, is blown into the gasification chamber from below through a grate. The product gas is conducted out of the gasification chamber in the upper part thereof. The advantage of this type of reactor is that the process functions even where the gasification material is very moist. The reactor design is very simple and easily scalable. The temperature of the product gas lies in the range from 150° C. up to 650° C. However, these gasifiers have the disadvantage that the product gas is very heavily tar-laden, the tars concerned being predominantly primary tar species. Typical values for these are 50 to 200 $g/m_n^3$. These are normally oxygen-containing. Sulfur compounds are also contained in the product gas in organic form, which is why conventional sulfur absorbers do not exhibit the desired cleaning effect.

In co-current gasifiers, the gasification material is normally introduced into the gasifier from above. The gasification medium, mostly air, is also blown into the gasification chamber from above. The product gas is conducted out of the gasification chamber in the lower part thereof. The advantage of this type of reactor is that the product gas is almost tar-free with tar loadings of around 0.05 to 0.25 $g/m_n^3$. However, the process is very sensitive to the moisture levels of the gasification material as well as to the geometry thereof. This is due to the fact that the gasification material cannot lie on a supporting grate but is held by a controlled bridge formation. The reasons for this are the high temperatures in the lower region of the gasification chamber which make use of a grate impossible. Furthermore, the reactor design is not easily scalable. The temperature of the product gas lies in the range from 650° C. up to 1050° C. Sulfur compounds are contained in the product gas generally in inorganic form, which is why conventional sulfur absorbers can be used. Problems can additionally occur in the fixed-bed gasification of gasification material which is high in ash content.

Fluidized bed gasifiers were developed to circumvent these problems. They are virtually unlimited in terms of possible plant size. At the moment, fluidized bed gasifiers are the types of gasifier most used for generating electricity from biomass. They have moderate tar loadings of around 15 $g/m_n^3$. and are relatively insensitive to variations in the feed moisture. A disadvantage is that the reactors and process control are relatively complex.

Product-Gas Cleaning

The product gas from biomass gasification contains numerous contaminants such as e.g. sulfur compounds and tar-type compounds and particulates. In general, these substances are removed from the product gas in process steps at relatively low temperatures up to a maximum of 200° C. This is useful, since the work machines (gas engines and gas turbines) used in the prior art need low gas-intake temperatures to achieve higher efficiency levels.

The problems of the condensation of tars at temperatures below 400° C. and of clogging by particulates are solved by scrubbing in appropriate gas scrubbers. Various scrubbing liquids such as e.g. water or diesel can be used.

Sulfur species are less problematical for gas turbines and gas engines. Sulfur-absorber materials which can be used at temperatures between room temperature and 200° C. are known from steam reforming processes. With regard to the cleaning of product gas of organic sulfur compounds, the following publications are known:

WO 2005/007780 A2 [16] discloses a two-stage desulfurization unit in which in the first desulfurization stage the majority of organic sulfur compounds can be absorbed by means of a zeolite (obtainable from Südchemie). The absorber materials used first crack organic sulfur compounds and also absorb a proportion. The absorber materials used can be regenerated. In the second desulfurization stage, the remaining organic sulfur compounds are removed by a non-regenerable sulfur absorber. Between the two desulfurization stages, a gas-liquid separation takes place, by means of which organic sulfur compounds are concentrated in the liquid phase. This is then combusted or otherwise disposed of.

WO 02/22763 A1 [17] describes a fluidized bed desulfurization unit for the adsorption of organic sulfur compounds from common propellants such as e.g. diesel.

U.S. Pat. No. 5,157,201 [18] describes the direct adsorption of organic sulfur compounds at temperatures below 175° C. in absorber beds.

Product-Gas Conditioning

The composition of the raw gas as well as the type and the design of the fuel cell charged therewith determine the degree of product-gas conditioning needed. Particular account has to be taken here of the durability and the efficiency of the fuel cell. Hydrogen is the preferred fuel for fuel cells. The production of hydrogen of adequate purity as a fuel is, however, time-consuming and costly. Added to which, centrally produced hydrogen is difficult to store and to transport. This harbors risks such as e.g. a high risk of explosion [1].

Research and development is therefore heading in the direction of system-integrated hydrogen production from fossil and renewable hydrocarbon sources. Hydrogen can be obtained from hydrocarbons by means of the following processes:

Steam Reforming STR

Steam reforming STR is the dominant process for generating synthesis gas from hydrocarbons. Synthesis gas is a mixture of hydrogen and carbon monoxide. The STR process is nowadays a mature technology and therefore cheaper [2] and more efficient [3] [4] than all other known processes for obtaining hydrogen from hydrocarbons, such as e.g. non-catalytic partial oxidation.

The strongly endothermic STR reaction of hydrocarbons, which may also contain some oxygen, with steam to produce a mixture of carbon monoxide and hydrogen follows the stoichiometry:

$$C_xH_yO_z+(x-z)H_2O \leftrightarrow xCO+(x+0.5y-z)H_2(-\Delta H_R \ll 0)$$

For methane, this gives the following:

$$CH_4+H_2O \leftrightarrow CO+3H_2$$

The great demand for process heat at a high temperature level of around 800° C. explains why the reactor design is typically heat-transfer limited. The materials used are typically Group 8 metals [4], of which nickel is the most cost-effective but nonetheless a highly active metal. The carbon monoxide produced by STR is converted via the exothermic water gas shift WGS to hydrogen:

$$CO+H_2O \leftrightarrow CO_2+H_2(-\Delta H_R>0)$$

If the steam reforming proceeds at appropriately low temperatures, exothermic methanization can also play a role, in which carbon monoxide, which has been produced from reacting hydrocarbons, is converted to methane:

$$2CO+2H_2 \leftrightarrow CH_4+CO_2(-\Delta H_R>0)$$

The poisoning of STR catalysts is a problem since the gases to be reformed usually contain small quantities of sulfur. Sulfur chemisorbs at corresponding temperatures on any metallic surface and thereby blocks active centers of metallic catalysts. The form in which the sulfur is present is of secondary importance here. A desulfurization stage is therefore arranged upstream of the STR process as a rule.

The second main problem in STR processes is the appearance of carbon deposits. High steam partial pressures are suitable for preventing these unwanted reactions. With nickel as an STR catalyst, the "steam-to-carbon ratio" SC is typically set to values of around two and above [5].

Non-Catalytic PO and Catalytic Partial Oxidation CPO

PO or CPO is an alternative to STR. Here, hydrocarbons which may also contain some oxygen, are broken down into a mixture of hydrogen and carbon monoxide. The reaction follows the following stoichiometry:

$$C_xH_yO_z+(0.5x-z)O_2 \leftrightarrow xCO+0.5yH_2(-\Delta H_R>0)$$

The carbon monoxide produced is converted via the likewise exothermic WGS to hydrogen. In the case of PO, the hydrocarbon molecules react with oxygen at temperatures between 1100 and 1900K [6]. The added oxygen is not, however, sufficient for complete combustion. PO reactors are preferably used for generating hydrogen from liquid hydrocarbon mixtures (gasoline, diesel, etc.), as the process heat in the reactor can be used for vaporization.

The reactors are also distinguished by their compactness, which is why they are also suitable for mobile applications. A very important advantage of PO is that no deionized water is needed. The corresponding apparatus or exhaust gas recycling can consequently be dispensed with. The chief disadvantage of PO is that fuel has to be burnt to maintain the high temperatures needed. The chemical efficiency is therefore lower than that of the STR of hydrocarbons [3].

In this regard, catalysts have increasingly been developed recently which allow the process temperature to be reduced. This so-called catalytic partial oxidation CPO proceeds at temperatures of around 800° C. and below.

In relation to catalytic partial oxidation, EP 0 576 096 A2 [19] discloses a method for producing a catalyst which catalyzes the partial oxidation of hydrocarbons.

In US 2003/0180215 A1 [20], the method for producing a catalyst which catalyzes the partial oxidation of methane at around 500° C. is described. Particular reference is made to the pore structure of the catalyst.

Autothermal Reforming ATR

The combination of STR and CPO is designated ATR. In contrast to PO and CPO, in which only molecular oxygen is used as an oxygen source, in ATR, molecular oxygen and steam are used as sources of oxygen. The reaction follows the stoichiometry:

$$C_xH_yO_z+0.5*(0.5x-z)O_2+0.5*(x-z)H_2O \leftrightarrow xCO+0.5*(x+y-z)H_2(-\Delta H>0)$$

ATR needs less steam than conventional STR. The process heat needed is generated by the exothermic partial oxidation, as a result of which heat management in ATR is significantly easier that is the case with STR [8].

In-situ measurements of temperature profiles in ATR monoliths have shown that two reaction zones form therein. In a hotspot, the molecular oxygen is consumed fully at temperatures of around 1000° C. and some of the fuel gas is combusted. The remaining hydrocarbon compounds are then converted by means of STR. In the process, the heat released in the hotspot and reaction water formed are consumed. More precise information can be found in [7].

Solid Oxide Fuel Cell

Solid oxide fuel cells SOFC produce electricity through chemical reactions occurring in a spatially separated manner, in which, as in batteries, a flow of electrons is produced between the reaction spaces. The core of the fuel cell is the electrolyte which divides the two reaction spaces from one another and prevents direct mixing of the reaction partners. Electrodes are attached to the electrolyte. On the anode side, the fuel gas flows along and is oxidized, giving up electrons. The oxygen necessary for this comes from the cathode side in ionized form through the electrolyte. The electrons released at the anode are conducted to the cathode via an external electrical circuit. The partial reactions proceeding at anode and cathode and the overall reaction can be formulated as follows:

Anode reaction $H_2+O^{2-} \rightarrow H_2O+2e^-$

Cathode reaction $0.5O_2+2e^- \rightarrow O^{2-}$

Overall reaction $H_2+0.5O_2 \rightarrow H_2O$

Conversion of the fuel to electricity occurs therefore without any rotating parts or generators.

Walter Hermann Nernst's discovery dating from 1899 that zirconium oxide (ZrO2) at appropriately high temperatures is conductive for oxygen ions was the starting point for the development of SOFC technology [12]. The most important properties of this technology are summarized briefly below:

The efficiency of fuel cells is basically not limited by the Carnot efficiency. SOFCs have the highest efficiencies in the conversion of fuel gas to electricity [9].

SOFCs can be operated in a large range of temperatures from 500° C. to 1000° C. [10].

The high operating temperatures of SOFCs and the typically incomplete fuel consumption of SOFCs offer great potential for use in hybrid systems [9]. The waste heat generated in the SOFC at a high temperature level allows the use of gas and steam circuits as a "bottoming" circuit. Waste heat that would otherwise be lost can in this way be made usable.

Thermodynamic calculations have shown that systems operated under pressure would probably allow a further efficiency increase. The pollutant emissions of such hybrid systems are expected to be low as the main fuel conversion takes place electrochemically. The same applies to the carbon dioxide emissions which directly correlate inversely proportionally to the efficiency of the system.

The high operating temperatures of SOFCs permit the use of cheap catalyst materials in comparison to low- and medium-temperature fuel cells. Typically, nickel is used as an anode catalyst in SOFCs. By comparison, in polymer electrolyte membrane fuel cells [10] platinum is used.

SOFCs have a high degree of flexibility in terms of the composition of the fuel gas, since, besides hydrogen, they can also convert carbon monoxide and even hydrocarbons electrochemically [10]. In addition, the high operating temperatures and the catalyst materials used allow thermally integrated STR and WGS of fuel gases. The conversion of the fuel gases can occur either outside the fuel cell, in a separate reactor which receives the process heat needed from the fuel cell, or inside the fuel cell. In the case of internal STR, the endothermic character of STR can be used to cool the fuel cell chemically in order by so doing to reduce the amount of waste heat and consequently to increase efficiency [2]. The steam needed for STR is produced continuously by the exothermic electrochemical reactions. The proportion of internal reforming for optimum efficiency is dependent on numerous factors. It was shown in [11] that for the system examined there internal reforming of 30% yields the greatest efficiency. Besides the possible increase in efficiency, the complexity of the overall system, in the case of internal reforming, is simplified by the omission of a separate STR reactor [2].

Despite the advantages, direct internal reforming has not yet established itself on a broad basis. This can be ascribed to the technical problems associated with it. Carbon deposits inside the SOFC due to the breakdown of hydrocarbon compounds rather than their reformation can lead to clogging. Nickel as a catalyst is particularly susceptible in this regard. In addition, the use of highly active STR catalysts can result in a very concentrated STR zone. This could produce high thermal gradients in the cells, which can lead to high mechanical loadings and ultimately failure of the SOFCs [2]. As well as the catalyst used, the electrical load which is applied also plays a role in respect of the optimum proportion of internal STR. In particular, where there are changes in load toward lower loads, this may result in the failure outlined.

SOFC technology can be adapted relatively easily for systems in the power output range from a few watts to several megawatts [9].

SOFC technology has not yet matured. The current status of development of the technology extends from fundamental research in the field of material sciences to the operation of pre-commercial systems and the development of market-entry strategies.

Self-Contained Systems for Generating Electricity from Biomass by Means of Gasification The state of the art in electricity generation in medium-sized to large biomass plants over 5 $MW_e$ is a combination of pressure-driven fluidized-bed gasifiers with gas turbines and an additional steam cycle, or combined cycles (CC) as they are known. These systems achieve efficiencies of up to 40%. In plants with power outputs below 5 $MW_e$, gas engines are generally used in place of gas turbines. These are more efficient and more cost-effective in the respective power output range. In such systems, efficiencies of around 25% are typically achieved.

Until now, no plants for generating electricity from biomass have been built which use a solid oxide fuel cell. However, a number of patents have been applied for whose aim is as a rule smart thermal integration between the gasifier unit (biomass or coal) and the fuel cell.

U.S. Pat. No. 5,554,453 [21] Discloses:

Thermal integration between the high-temperature fuel cell used is effected by means of catalytic combustion of the anode exhaust gas, which is conducted directly from the fuel cell into the coal gasifier. The catalytic combustion takes place in a reactor housing which is located within the coal gasifier. By this means, the combustion heat released is used directly to support the endothermic gasification reactions. In the patent, controllability of the system and gas-cleaning steps are not discussed in detail.

U.S. Pat. No. 4,921,765 [22] Describes:

The thermal integration between the high-temperature fuel cell used and the catalytically supported coal gasifier is effected by means of recirculation of the anode exhaust gas, which is converted fully inside the high-temperature fuel cell. This anode exhaust gas thus consists only of carbon dioxide and steam. The carbon dioxide contained in the feed gas from the gasifier is removed upstream of the fuel cell and conducted to the cathode current. There, it is needed for the electrochemical reactions. The necessity for desulfurization and particulate removal are discussed in a very general manner. Control-engineering aspects are not touched upon.

US 2002/0194782 A1 [23] aims at thermal integration between a high-temperature fuel cell and a biomass fluidized-bed gasifier. The latter exhibits the special feature that the combustion part, in which unreacted carbon is combusted and in this way an inert bed material heated up, is located inside the gasification part. The exchange of heat between combustion part and gasification part is thus effected by means of convection and heat radiation between the reactor walls and by means of the inert circulating bed material. Thermal integration of the high-temperature fuel cell is effected by means of the combustion of unreacted anode gas in the combustion part of the gasifier. The combustion gas from the combustion part is fed to the cathode of the high-temperature fuel cell. Control-engineering aspects and necessary gas-cleaning steps are not discussed in detail.

The object of the present invention is to provide a method and a plant for converting solid biomass into electricity by means of a gasifier-fuel cell combination which combines a plurality of process units in a self-contained system.

This object is achieved in the features specified in the independent claims.

Advantageous further developments of the present invention are specified in the dependent claims.

The invention will be explained in greater detail for example with the aid of the figures, in which:

DESCRIPTION OF THE INVENTION

Figure 1:
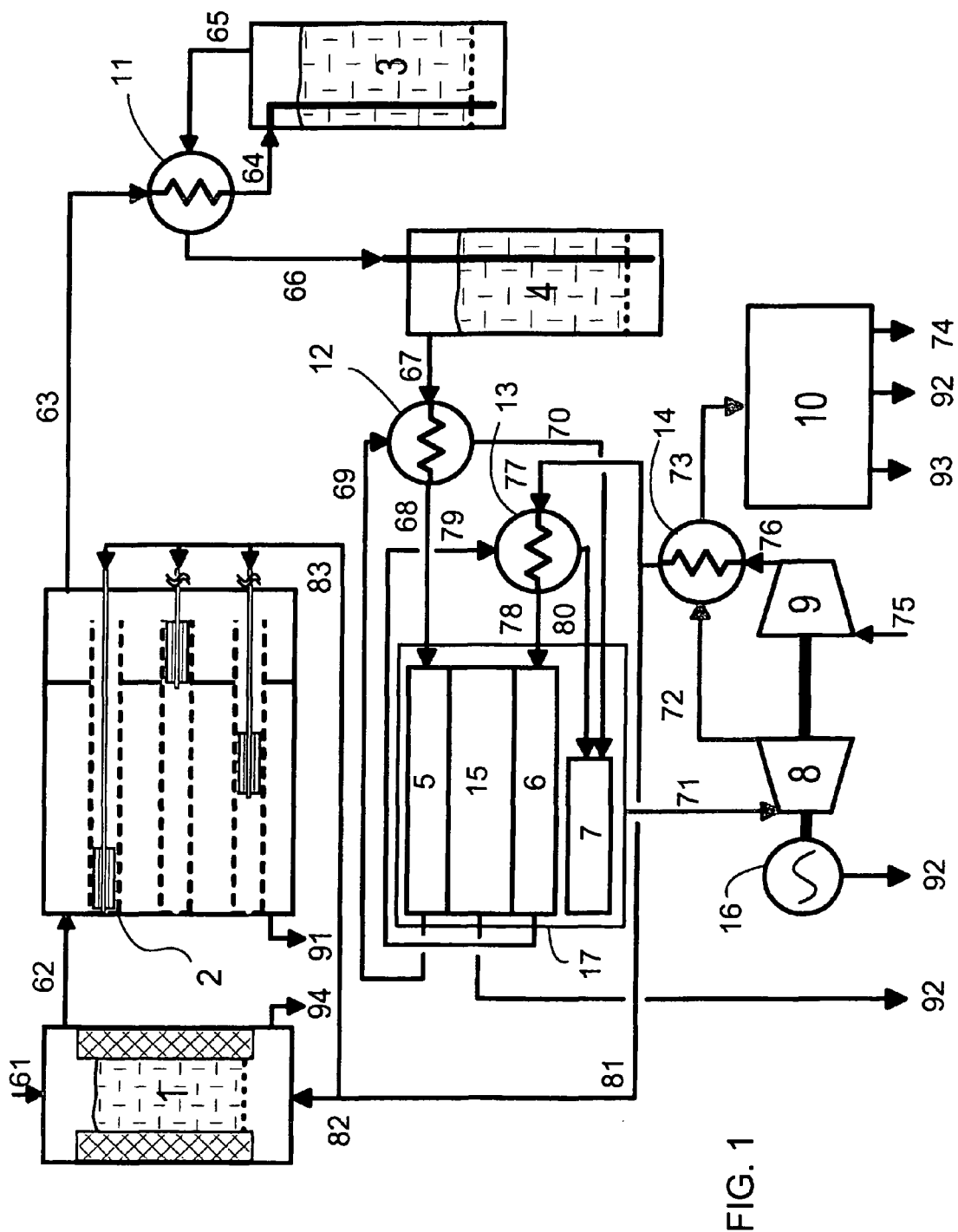
FIG. 1 shows a schematic representation of the plant.

The plant for the thermal and control-engineering integration of high-temperature fuel cells and biomass gasification emerges from FIG. 1:

The biomass 61 is introduced from above into the gasifier 1. There, the biomass 61 is converted with pre-heated air 82 into a mixture of particulates, steam, hydrogen, carbon monoxide, carbon dioxide, methane, nitrogen, higher CH species, tar compounds, hydrogen sulfide, organic sulfur species as well as other trace substances.

In the case of a counter-current gasifier, the proportion of condensable species in the raw product gas 62 is high and makes up approx. 25% of its fuel value. The tar compounds present in the raw product gas 62 are generally oxygen-containing and, due to the temperature of the product gas of approx. 600° C., are in the gaseous phase. Alkalines and heavy metals condense at these temperatures as a rule on larger particles. If the temperature of the product should rise above the vaporization temperature of heavy metals and alkalines, this can be cooled through the addition of water. Sulfur compounds are as a rule of an organic nature.

In the case of a co-current gasifier, the product gas contains virtually no (higher) hydrocarbons, so chemical cooling of the downstream fuel cell by means of internal steam reforming is limited.

Figure 2:
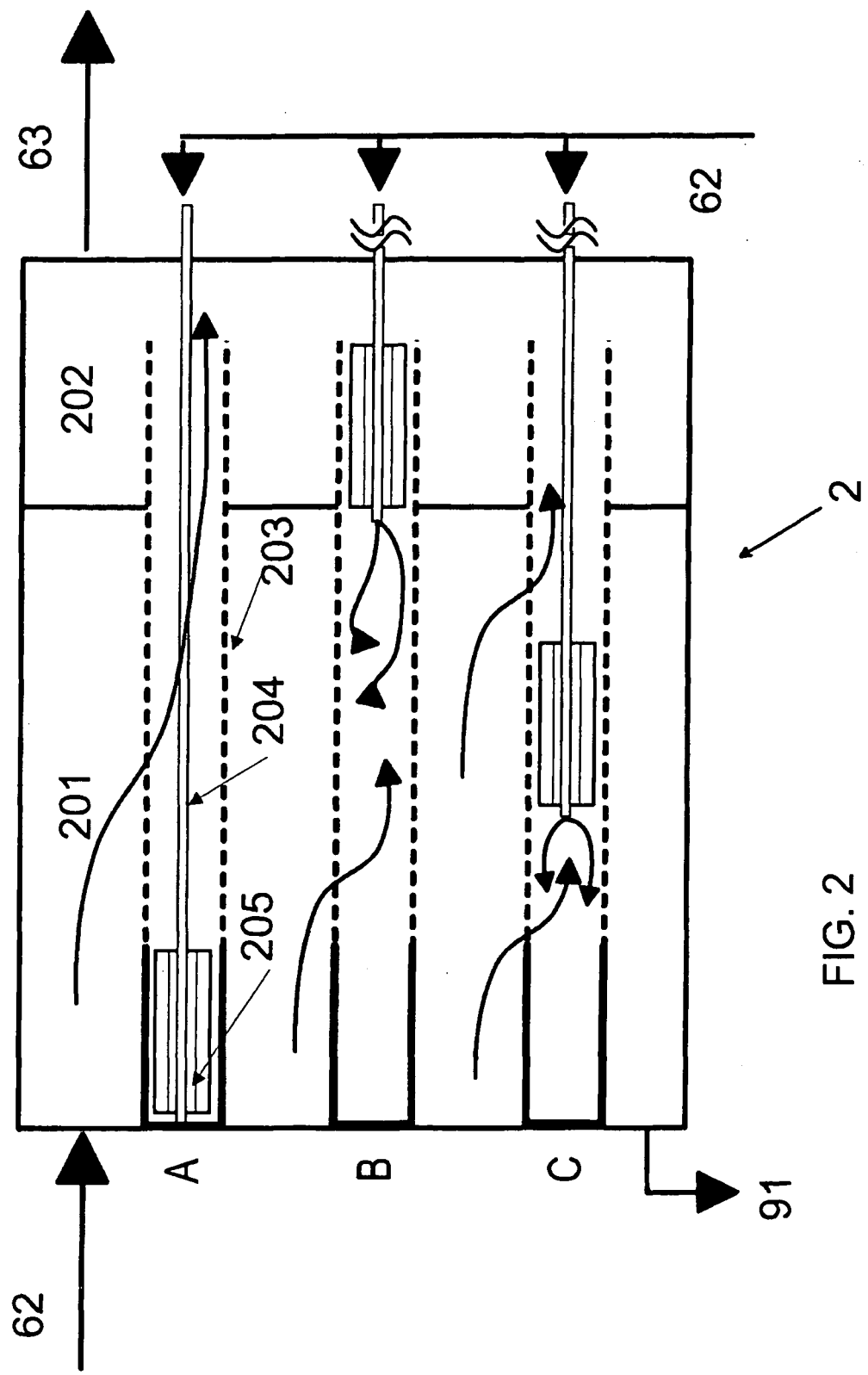
FIG. 2 shows a schematic representation of the particle filtration unit with integrated catalyst monolith for achieving a variably adjustable proportion of catalytically converted product gas.

The raw product gas 62 is then conducted into an apparatus 2 for the removal of particulates (see also FIG. 2). The apparatus 2—also referred to in this document as a particle separator 2—essentially consists of the two separate chambers 201 and 202: raw-gas chamber 201 and clean-gas chamber 202. The particulates with the alkalines and heavy metals condensed on them are prevented by high-temperature-resistant filter elements 203 from passing from raw-gas chamber 201 to clean-gas chamber 202 and are deposited as filter cake on the filter elements. The filter cake is removed from the filter elements and carried out of the apparatus cyclically depending on the pressure loss over the filter elements produced thereby by means of pressure pulses of particulate-free product gas. Catalytically coated monoliths 205 are rigidly or movably accommodated inside the filter elements 203. The monoliths 205 correspond to catalytic reactors in which condensable species are post-gasified and/or the above-mentioned reversible reactions of steam reforming, water-gas shifting and methanization can proceed. The proportion of raw particulate-free product gas which can flow through the monolith can be adjusted by altering the position of the monolith. This is enabled in particular by the homogeneous distribution of pressure inside the filter elements.

FIG. 2 shows by way of example 3 different positions of the catalyst monolith. In case A, the monolith 205 is located in the no-load position. The raw particulate-free product gas is conducted together with its high loading of tar compounds, which also contain oxygen, and organic sulfur compounds into the clean-gas chamber 202 and then leaves the particle separator 2 as clean gas 63. In case B, the monolith 205, cf. FIG. 2, is located in the full-load position. The raw particulate-free gas is conducted entirely via the catalytically coated and active monolith. There, virtually all the aromatic and oxygen-containing tar compounds are broken down into hydrogen and carbon monoxide. Furthermore, some measurements have shown that virtually all the organic sulfur compounds are converted to hydrogen sulfide. The clean product gas 63 leaves the apparatus 2 as flow 63. In case C, approximately half of the raw product gas is conducted via the monolith. The catalytically converted product gas is then mixed with the raw product gas.

In the case of a counter-current gasifier, the mixture has a lower loading of hydrocarbon compounds than the raw product gas and leaves the apparatus 2 as clean gas 63.

In the case of a co-current gasifier, the methane content can be increased, which enables chemical cooling of the downstream fuel cell by means of internal steam reforming. The quantity of air, hydrogen and/or steam needed for catalytic conversion is adjusted on the basis of the temperature in the monolith and thus always enables optimum conditions for catalytic conversion. The pre-heated quantity of air, hydrogen and/or steam 83 is introduced via a lance 204 which leads through the monolith into the interior of the filter elements where it mixes with the raw product gas. The mixture is then conducted through the catalytic monolith. The filter elements prevent back-mixing with the raw product gas outside the filter elements.

The particulate-free and fully, partially or non-catalytically converted product gas 63 is then conducted into a heat exchanger where it is cooled down from temperatures of between approx. 650° C. and 850° C. to 400° C.: cooled product gas 64. After cooling, the gas flows through a zinc oxide bed with upstream dechlorination (second sulfur absorber 3). Measurements have shown that at this temperature the hydrogen sulfide concentration in the gas can be reduced to below 1 ppm without the thermal stability of the absorber material used being exceeded. The product gas 65 with a low hydrogen sulfide content leaves the second sulfur absorber 3 and is reheated to between 600° C. and 800° C. in the heat exchanger in which it was previously cooled: heated product gas with low hydrogen sulfide content 66.

The product gas 66 which has a low hydrogen sulfide content contains greater or fewer organic sulfur compounds depending on the proportion of catalytic conversion. In the standard case, the entire product gas is channeled for catalytic conversion. If fluctuations in the biomass composition or moisture necessitate only partial catalytic conversion, then the product gas 66 which has a low hydrogen sulfide content still contains a certain quantity of organic sulfur compounds. The product gas 66 is conducted into the first sulfur absorber 4 where the organic sulfur compounds are absorbed at temperatures between 600° C. and 800° C. by an (e.g. perovskite) absorber material.

The product gas 67 which is now particulate-free, fully, partially or non-catalytically converted and fully desulfurized is then conducted into a second heat exchanger 12 in which the heated desulfurized product gas 68 is heated by the hot anode exhaust gas 69 to almost the operating temperature of the anode 5.

At the anode 5 of the fuel cell 17, more or less of the product gas 68 is electrochemically converted depending on the charge applied. The anode exhaust gas 69 is used to heat up the desulfurized product gas 67 and is then conducted into a burner 7 where it is combusted with the cathode exhaust gas 80 which has already been cooled.

The hot flue gases 71 are relieved in a turbine 8 which drives a generator 16 and a compressor 9 by means of a shared shaft. The relieved flue gases 72 are used in a further heat exchanger for pre-heating the compressed air 76 in the compressor 9 before they are used in a steam circuit for generating further electricity 92 (electrical energy to be precise) and useful heat 93.

The air 75 sucked in by the compressor 9 is divided after compression and pre-heating into two portions. The flow 77 is conducted into a third heat exchanger 13 where it is brought by the cathode exhaust gas almost to the operating temperature of the cathode 6. This corresponds to the temperature of the anode 5. The second portion of compressed pre-heated air 81 is in turn divided into two portions. Flow 82 is introduced as a gasification medium 82 into the gasifier 1. Air can be introduced into the particle filter system 2 with integrated catalytic conversion, in which, if necessary, it serves as part of the reaction medium 83.

The proposed invention combines a plurality of process units known in the art into a self-contained system whose properties are superior to [those of] the sum of all the individual process units.

The combination of biomass gasification with SOFCs makes it possible for the hydrocarbon compounds contained in the product gas, some of which are oxygen-containing, to be used for internal reforming with low risk of carbon deposition in the SOFC. The SOFC is chemically cooled by this means, which leads to lower quantities of waste heat. In addition, the hydrocarbon compounds can be converted as required at the high operating temperatures sought into hydrogen and carbon monoxide. In the case of a product gas which contains only small quantities of hydrocarbons, as is, for example, the case with autothermal co-current biomass gasification, chemical cooling of the SOFC is scarcely possible, which impacts negatively on the overall efficiency of the system. The generation of hydrocarbon compounds (e.g. methane) from hydrogen and carbon monoxide is, however, possible at appropriate operating temperatures by means of catalytic methanization.

The condensable tar compounds contained in the product gas from biomass gasification are converted to hydrogen and carbon monoxide by means of catalytic conversion (e.g. autothermal reforming). Integration of the appropriate monoliths within the filter elements of the particle filtration system makes it possible for the proportion of oxygen-containing hydrocarbon compounds to be varied. ATR corresponds in the broader sense to a second gasification stage which can be switched to steplessly. It is possible as a result to adjust the proportion of internal reforming inside the SOFC so as to be optimal for efficiency in each case. The influence of internal reforming on the efficiency of SOFCs was shown in [11, 14]. In the system studied and under given operating conditions, the difference stood at 2.5% efficiency points. The degree of internal reforming is thus a parameter which has to be optimally adjusted to the operating conditions in each case so as to guarantee optimum efficiency of the SOFC at any time. This signifies, besides the cooling-air mass, an extra variable for product-gas-driven fuel cell plants with which a better reaction can be obtained e.g. to transients under load. In the case of a load reduction, the proportion of hydrocarbons in the fuel gas can be adjusted such that the cooling-air quantity and temperature can be held relatively constant, which benefits any added combined-cycle process. Furthermore, this enables systems which are operated with heterogeneous biomass as a fuel to react to fluctuating fuel characteristics such as e.g. the moisture of the biomass and its chemical composition.

In addition to the conversion of tar compounds, organic sulfur compounds are also converted to hydrogen sulfide through catalytic conversion of the product gas. Normal absorber materials, which enable very low sulfur concentrations to be achieved and are cost-effective, can thus be used for desulfurization.

Biomass gasification and the SOFC are thermally integrated by means of air pre-heating.

LIST OF REFERENCE CHARACTERS USED 1 counter-current fixed-bed gasifier
2 apparatus, particle separator, reactor for catalytic conversion
3 second sulfur absorber
4 first sulfur absorber
5 anode
6 cathode
7 burner
8 turbine
9 compressor
10 steam circuit and useful heat
11 first heat exchanger
12 second heat exchanger
13 third heat exchanger
14 fourth heat exchanger
15 electrolyte
16 generator
17 fuel cell
61 biomass
62 raw product gas
63 fully, partially or non-catalytically converted product gas
64 cooled product gas 63
65 product gas with low hydrogen sulfide content
66 heated product gas with low hydrogen sulfide content; product gas low in hydrogen sulfide
67 desulfurized product gas
68 heated desulfurized product gas
69 anode exhaust gas
70 product gas
71 hot flue gas
72 relieved flue gases
73 cooled relieved flue gases
74 exhaust gases
75 air
76 compressed air
77 compressed air
78 air
79 cathode exhaust gas
80 cooled cathode exhaust gas
81 pre-heated air
82 pre-heated air; gasification medium
83 pre-heated air; reaction medium
91 particulates
92 electricity, electrical energy
93 useful heat
94 ash
201 raw-gas chamber
202 clean-gas chamber
203 high-temperature-resistant filter elements
204 lance
205 catalytically coated or active monoliths

CITED REFERENCES

[1] "Hopes for a flame-free future", K. Kendall, Nature, Volume 404, Pages 233-234, 2000
[2] "An updated assessment of the prospects for fuel cells in stationary power and chp", DTI Report, URN no. 05/705
[3] "Development update on Delphi's solid oxide fuel cell system", S. Shaffer, 6$^{th}$ Annual SECA Workshop, Delphi/Battelle, 2005
[4] "Fuel cells—fundamentals and applications", L. Carrette at al., Fuel Cells, Volume 1, Issue 1, Pages 5-39, 2001
[5] "Reaktionskinetische Untersuchungen zur Methan-Dampf-Reformierung und Shift-Reaktion an Anoden oxidkeramischer Brennstoffzellen", R. Leinfelder, Dissertation, University of Erlangen-Nuremberg, 2004
[6] "A comparative study of fuels for on-board hydrogen production for fuel-cell-powered automobiles", L. F. Brown, International Journal of Hydrogen Energy, Volume 26, Issue 4, Pages 381-397, 2001
[7] "Reaktionstechnische Untersuchungen zur katalytischen partiellen Oxidation von Methan mit Sauerstoff zu Synthesegas in Fettbettreaktoren", U. Bartmann, Dissertation, Ruhr University Bochum, 1999

[8] "Fuel cell systems explained", J. Larminie, A. Dicks, John Wiley & Sons, ISBN 0-471-49026-1

[9] "Perspectives on fuel cells vs. incumbent technologies", R. Bosch, Delphi, Fuel Cell Seminar 2005, 2005

[10] "Solid oxide fuel cells: systems and materials", L. J. Gauckler et al., Chimia, Volume 58, Issue 12, Pages 837-850, 2004

[11] "Thermodynamic modeling and performance of combined solid oxide fuel cell and gas turbine systems", J. Pålsson, Dissertation, Lund University, Sweden, 2002

[12] "The birth of the fuel cell (1835-1845). Complete correspondence between Christian Friedrich Schoenbein and William Robert Grove", U. Bossel, European Fuel Cell Forum, ISBN 3-905-59206-1

[13] "Heissentteerung von Brenngas aus der Vergasung von Biomasse durch katalytische partielle Oxidation", M. Klemm, VDI Progress Report Series 6, No. 525, 2005

[14] "Thermally integrated high power density SOFC generator", Fuel Cell Energy, Inc. Vera Power Systems Inc., SECA Annual Meeting, Pacific Grove, Calif. Apr. 18-21, 2005

[15] "Diesel and jet fuel processing for portable fuel cell applications", Z. Li, S. Kabachus, N. Ye, M. Fokema, Aspen Products Group, Inc., Fuel Cell Seminar, 2006

[16] WO 2005/007780 A2 "Methods and compositions for desulphurization of hydrocarbon fuels"

[17] WO 02/22763 A1 "Process for desulphurizing hydrocarbon fuels and fuel components"

[18] U.S. Pat. No. 5,157,201 "Process for adsorbing sulfur species from propylene/propane using regenerable adsorbent"

[19] EP 0 576 096 A2 "Process for the catalytic partial oxidation of hydrocarbons"

[20] US 2003/0180215 A1 "Controlled-pore catalyst structures and process for producing syngas"

[21] U.S. Pat. No. 5,554,453 "Carbonate fuel-cell system with thermally integrated gasification"

[22] U.S. Pat. No. 4,921,765 "Combined coal gasifier and fuel cell system and method"

[23] US 2002/0194782 A1 "Integrated biomass gasification and fuel cell system"

The invention claimed is:

1. A method of converting solid biomass into electricity, which comprises the following method steps:
A1) introducing solid biomass into a gasifier;
A2) introducing a gasification medium into the gasifier;
B) introducing a product gas originating from the gasifier into a particle separator to produce a product gas with low particulate content;
C) introducing the product gas with low particulate content emerging from the particle separator into a reactor for catalytic conversion;
D) introducing the product gas with low particulate content into a sulfur absorber to produce product gas substantially freed of sulfur;
E) introducing the product gas substantially freed of sulfur in the sulfur absorber into a fuel cell for generating electrical energy;
F) executing method steps B and C in a single apparatus
G) using a monolith inside a filter element for complete or partial catalytic conversion in the apparatus;
H) using a by-pass control for adjusting the catalytic conversion in respect of the product gas with low particulate content; and
the bypass control shifting the monolith within the filter element infinitely variable from a fully passive position into a fully active position, wherein the monolith is, in the fully passive position, completely bypassed by the product gas with low particular content, and the product gas with low particulate content is forced to entirely flow through the monolith when positioned in its fully active position.

2. The method according to claim 1, which comprises, prior to method step D, raising a temperature of the product gas with low particulate content in a heat exchanger to a temperature corresponding to a temperature of the sulfur absorber.

3. The method according to claim 2, which comprises, prior to method step E, raising a temperature of the product gas which has been substantially freed of sulfur in a heat exchanger to a temperature corresponding to a temperature of an anode of the fuel cell.

4. The method according to claim 3, which comprises introducing anode exhaust gases from the fuel cell into the heat exchanger.

5. The method according to claim 1, wherein method step D comprises introducing the product gas with low particulate content into a second sulfur absorber.

6. The method according to claim 1, which comprises introducing a further reaction medium into the reactor for catalytic conversion for the complete or partial catalytic conversion of the product gas with low particulate content.

7. The method according to claim 6, which comprises introducing the further reaction medium into the apparatus with a lance and selecting the further reaction medium from the group consisting of air, hydrogen, and steam.

* * * * *